Jan. 27, 1925.  1,524,617
A. A. GOUBERT
PROCESS OF DRYING CANDIES AND THE LIKE
Filed June 26, 1924   2 Sheets-Sheet 1

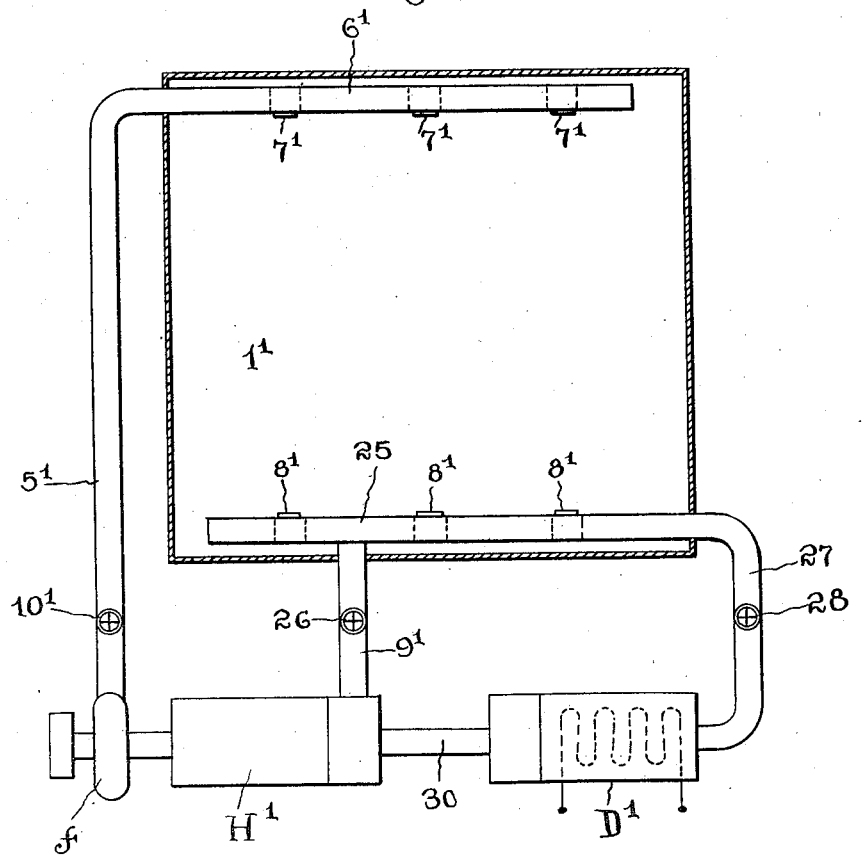

Patented Jan. 27, 1925.

1,524,617

UNITED STATES PATENT OFFICE.

AUGUSTE A. GOUBERT, OF ENGLEWOOD, NEW JERSEY.

PROCESS OF DRYING CANDIES AND THE LIKE.

Application filed June 26, 1924. Serial No. 722,620.

*To all whom it may concern:*

Be it known that I, AUGUSTE A. GOUBERT, a citizen of the United States, and resident of Englewood, in the county of Bergen and State of New Jersey, have invented certain new and useful Improvements in Processes of Drying Candies and the like, of which the following is a specification.

The present invention relates to the art of drying or conditioning of confections and particularly of candies which in the initial stages of manufacture are in fluid or semi-fluid state and consists of an improved process which in operation accomplishes the removal of moisture from the articles under conditions which materially contribute in obtaining a finished product of improved form and condition. My improved process is further designed particularly to eliminate certain detrimental factors and to offer substantial advantages and economies over the methods of drying candies as at present practiced.

In the manufacture of certain grades of candy, such as gum drops, marshmallow, cream centres, etc., a certain mixture of various ingredients, such as gelatin, sugar, glucose, etc., has to be prepared in a fluid or semi-fluid state, and in order to do so, a certain amount of water has to added.

Moulds for the casting of the candy into various shapes have to be prepared, which consist generally of a shallow tray filled to a thickness of about 1" with dry starch and into which rows of impressions have been made to form moulds for the reception of the fluid mixture, after which when the moulds have been filled with the candy mixture, these trays are then stacked up on trucks one above the other, leaving an air space between them and wheeled into a drying chamber where the required temperature is maintained to dry the goods within a given time. This is best done by the circulation of heated air in these rooms, this air being constantly recirculated for the sake of economy with a certain proportion of it renewed from the outside so as to avoid a state of saturation of the air and to maintain a drying condition. The temperature at which the drying takes place varies with the kind of goods, as for instance, gum work is dried at 150° temperature; marshmallow and cream centres at approximately 90°. Much care has to be exercised in this respect, as for instance if gum work is dried at too high temperature and too rapidly, it will case harden on the surface and prevent the absorption of moisture from the interior. The same will happen with marshmallow which also if kept too long in a drying room under hot conditions will become sour. Cream centres will remain soft and not dry at all. All this, however, is a matter of proper regulation by an experienced attendant.

After the goods have been kept in a dry room for a sufficient length of time to have arrived at the proper degree of dryness, the goods are removed from the kiln and taken into a storage room where they are allowed to cool under atmospheric conditions to the normal temperature of the room. The difficulty then arises that the hygrometric conditions of this room vary constantly in accordance with those of the outside air. With dry atmospheric conditions the work goes on satisfactorily, but with a considerable proportion of moisture in the air the goods become sticky, the starch becomes damp, absorbing as much as 32 to 35% of moisture, whereas its normal condition should be five percent, so that this starch cannot be used again for moulding without being dried anew.

A further difficulty often arises in that the goods being suddenly carried from the hot drying room into another of considerably cooler temperature, a comparative chilling takes place which causes the top surface of the candy to sink in, forming cups or depressions which often cause the rejection of a whole batch of goods.

Also, if when the candy is removed from the moulds for further operations, the starch is damp, some of it adheres to the candy and cannot be satisfactorily removed even by brushing, with the result that chocolate coating, for instance, will not properly adhere to cream centres or marshmallows, nor will the crystallized sugar coating adhere to the gum drops. Nor can the starch be used again for moulds without being sifted and redried.

In accordance with my present invention the objections aforesaid are overcome by subjecting the articles to the influence of properly dried or conditioned air in the process of drying and particularly throughout the cooling period and this is further accomplished in the desirable manner as hereinafter more fully described in a continuous operation without removal of the articles from the drying chamber with the result that the full operation of drying and cooling are carried out under definitely controlled conditions to insure an improved and perfected product and to allow of the starch to be immediately reused without reconditioning.

The described and other important advantages of my improved process will be further understood by reference to the accompanying drawings and detailed description thereof.

The drawing illustrates diagrammatically the apparatus and arrangement for carrying out my improved process in an approved manner.

Fig. 2 is a diagrammatic view illustrating the arrangement and apparatus for carrying out my improved process in a modified form.

Figure 1:
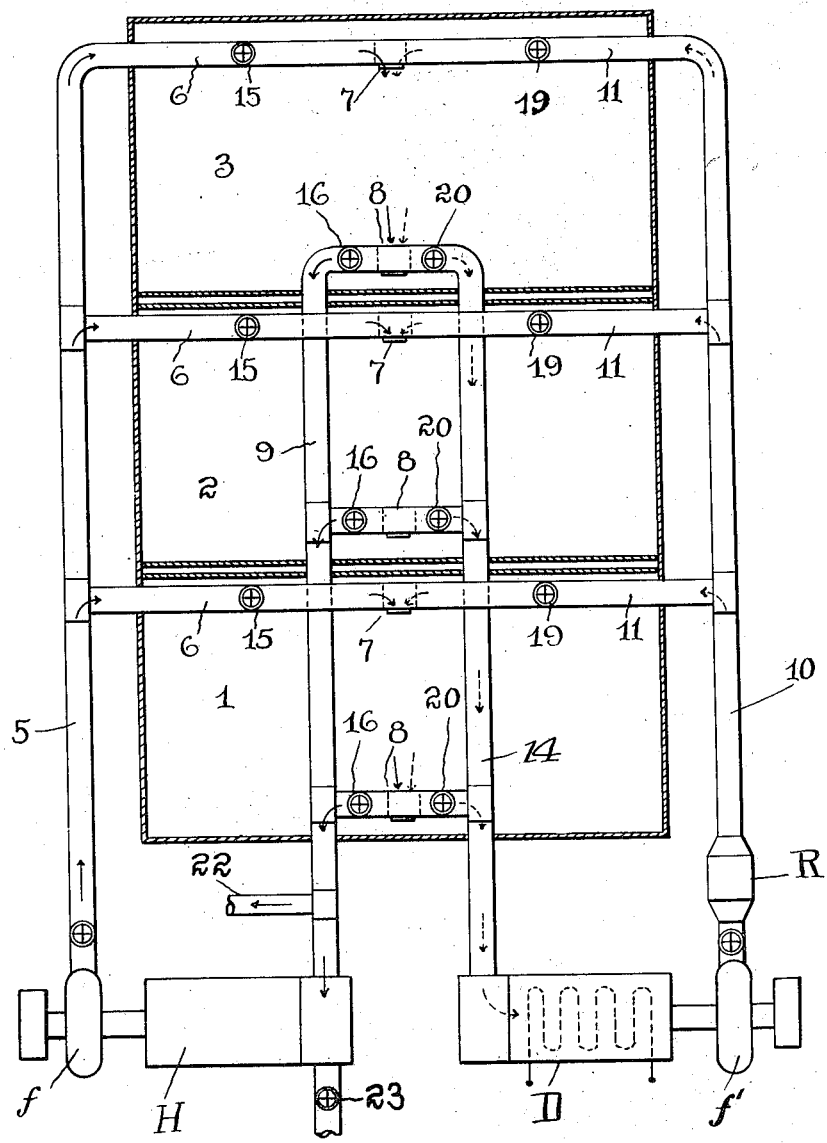
Fig. 1 is a diagrammatic view showing an approved arrangement and apparatus for carrying out my improved process in connection with a plural number of drying rooms.

The process of my invention while susceptible of being practiced in connection with a single drying room, is preferably carried out in the arrangement employing more than a single drying room, as illustrated in Figure 1 wherein the three drying rooms 1, 2 and 3 are arranged to be operated in sequence thereby to allow of continuous operation.

The arrangement and apparatus for carrying out my improved process as disclosed includes a suitable heater H for the heating of the air to be circulated through the respective drying rooms. The heated air supply from the heater H passes through the supply pipe or conduit 5 to the lateral or distributing pipes 6—6 and is discharged within the heating rooms or chambers through outlets or ports indicated at 7. As will be noted the air is introduced into the drying rooms at one side thereof and after being circulated is withdrawn at the opposite side thru intake openings 8 and thence passes through return pipe 9 to the heater H. At $f$ there is diagrammatically illustrated a fan or blower for circulating the air.

At D there is shown an air drying apparatus or dehydrator through which the air is passed in the second stage of the operation which may be referred to as the "drying and cooling operation" and the air supply therefrom is circulated after passing through a reheater R, through a supply pipe 10, through the distributing pipes 11 to the discharge outlets or ducts 7. Upon circulating through the rooms the air is withdrawn through the openings 8 and passes through connecting pipes to the return pipe 14 communicating with intake of the dehydrator. The dehydrating apparatus D may be of any suitable type for instance having a refrigerating coil over which the air is passed to effect the precipitation or removal of the moisture. At $f'$ a suitable blower is shown.

For controlling and regulating the circulated air in the two cycles as thus provided for, suitable valves or dampers are provided. Associated with the heated air cycle there is shown a main valve in the supply pipe or duct 5 and valves or dampers 15 to control the passage of the air from the discharge 7 into the respective drying rooms. Valves 16 are also provided as illustrated to allow of opening or shutting off of the return supply to the heater through the return pipe 9. A similar control is provided with relation to the circulation of the air supply through the dehydrator or with reference to the drying and cooling cycle. The main control valve is provided in the supply pipe 10 and individual valves or dampers 19 are provided in the distributing pipes 11 and valves or dampers 20 are provided in the return conduits, the valves 19 and 20 being adapted to regulate and control the circuit of dehydrated air with respect to the individual drying rooms.

As considered structurally the distributing pipes 6 and 11 may, as illustrated, be continuous with a single discharge opening and similarly the laterals of the return pipes 9 and 14 are continuous with a mutual intake whereby the discharge and intake portions of the laterals are operatively connected to one circuit or the other as the valves are opened and closed. At 22 there is shown a discharge pipe or duct from the return pipe 9 and communicating with the opening for the discharge of a portion of the heated air circuit and at 23 there is indicated a fresh air intake to the heater H.

Employing the facilities and apparatus as described my improved process may be carried out in the approved manner as follows:

At the start of the operation, the trucks with the trays of moulded candies stacked thereon are wheeled into the drying room and the initial stage of the drying process is carried on in the usual manner by the circulation of heated air. The circulation of the heated air is effected upon the opening of the valves or dampers 15 and 16 and with the valves 19 and 20 in closed position and the resulting circulation of the heated air for the initial or primary drying operation is indicated by the full line arrows in the drawing. Most of the air is recirculated through the heater H in the cycle as indicated so as to conserve heat, but a small proportion of outside air is desirably taken in through intake 23 and a like quantity discharged through outlet 22 so as to maintain proper hygrometric conditions. This is carried on at the proper temperatures relating to the class of goods handled until the articles are almost dry. The supply of heated air is then shut off by closing of the valves 15 and 16 may be diverted to another drying room. The valves 19 and 20 are then opened for the circulation through the drying room of conditioned air circulated from the dehydrator D and the conditioned air cycle or circuit is illustrated in the drawing by the dotted line arrows. This conditioned air, which may desirably have been brought down to a dew point of say 48° Fahr. by contact with the refrigerating coils or other means in the dehydrator D and reheated by the reheater R to a temperature of approximately 75°, at which it will have a relative humidity of 40% is circulated through the drying room at first in small volume so as not to cool the goods too quickly and then in gradually increasing quantity until the articles as well as the drying room have been brought down to a temperature of about 75%.

This conditioned air being dry, continues the drying process even at the comparatively low temperature and the condition is maintained in the drying room until the operator is ready to remove the goods. The goods may then be removed, say one truck at a time, which may be wheeled to the mogul and the trays dumped onto the screen for separating the starch. The candies may be further cleaned by a blast of dry air and in perfect condition free from starch taken to the coaters. The starch being in a properly dried condition is adapted for immediate reuse and may be spread again on the trays, the molds formed, the goods cast, stacked upon the truck and taken at once to another drying room where the process is repeated.

It will thus be seen that not only are the candies delivered in perfect condition, but the starch also can be reused at once without having to be fried again, which is one of the most troublesome factors in candy manufacturing, and thereby much labor is saved with substantial economies.

As will be apparent from the foregoing description my improved process may be carried out with the employment of a single drying room but the use of more than one, as illustrated, is advantageous in allowing of continuous operation by properly timing the operations in one chamber with relation to the others. For instance during the period of discharging and recharging of a chamber the initial drying and the final drying and cooling operations may be taking place in each of the other drying rooms. Upon completion of the operation the heated air may be diverted to the newly charged chamber or the dehydrated air circuit diverted to the drying room or chamber within which the initial drying has been performed and the goods may be discharged from the third drying room wherein the cooling has been effected.

A desirable modification illustrating my improved process as carried out in a single drying room is illustrated in Fig. 2. In the use of the single drying room $1^1$, or in the use of individual heating systems for each room, the dehumidifier or dehydrator $D^1$ may be connected in a by-pass arrangement with reference to the heater $H^1$ and a single system of air circulating ducts used. As shown, the circulating system comprises the supply duct or pipe $5^1$ from the heater $H^1$ in which there are interposed a circulating fan $f$ and a control valve $10^1$.

The supply duct is provided with a distributing extension or duct $6^1$ extended within the drying room at one side thereof and provided with a series of outlet ports $7^1$. At the opposite side of the room there is provided a return intake duct 25 provided with a series of intake ports $8^1$ and having a return pipe connection $9^1$ to the heater $H^1$ provided with a valve or damper 26. Provision for by-passing the circulation through the dehydrator $D^1$ is made by the connecting duct 27 connecting the intake duct with the intake side of the dehydrator and provided with a damper 28 and by means of a connecting duct 30 between the discharge of the dehydrator and the intake of the heater $H^1$.

In the operation of the single room drying system, as disclosed, the drying operation may first be performed with the damper 28 closed and the circulation maintained through the heater alone. At the end of the drying operation the valve 26 is closed and the valve 28 opened with the result that the air will be exhausted from the room and shunted through the dehydrator, the air drawn through this by the fan and passed through the heater $H^1$ to be heated under regulated thermostatic control and delivered to and circulated through the drying room at the temperature as set by the thermostat (not shown) and which can be progressively lowered as the process goes on.

Also during the drying process, instead of renewing a portion of the air to maintain a drying condition, a part of the recirculated air can be by-passed through the dehumidifier in which case, when the drying has reached the proper stage, it would do to merely shut the supply of steam to the heater, letting the small portion of cooled air mix with the warm circulated air, gradually reducing its temperature and finally drying and cooling the whole of the air. This would have the advantage of maintaining the full circulation and thereby effecting a better distribution through the drying room.

In the arrangement of several rooms, as shown on the drawing, there must be a heater preferably thermostatically controlled in the delivery duct from the dehumidifier.

When the candies are such as are dried at the higher temperatures, it is best during the drying process to reject a certain portion of the air and admit a like proportion of outside air, for the amount of humidity in this outside air will not materially affect the capacity of the high temperature air to absorb moisture. When, however, the goods such as marshmallows and cream centres have to be dried at a comparatively low temperature, say ninety degrees or less; there are days in summer when the outside air is very moist and will not materially improve the drying condition in the room. At such times, instead of taking in this outside air, much better results will be attained by the recirculating even during the drying period a portion and even all of the heated air through the dehumidifier and thus maintain the proper hygrometric condition. The by-passing or circulating of a portion of the air through the dehumidifier during the drying operation may of course be accomplished by the partial opening of the dampers controlling the circulation through the dehumidifier as will be readily understood.

Having described my invention I claim:

1. The herein described process of drying candies and the like which consists in subjecting the articles to the influence of dehydrated or conditioned air within the drying room and progressively cooling the air during the cooling period.

2. The herein described process of drying candies and the like which consists in placing the articles within a suitable drying chamber, circulating heated air through the chamber in a cycle with the withdrawal of a portion of the air and addition of air to the supply for maintaining proper hygrometric conditions, and subsequently circulating dehydrated air through the chamber with a progressive lowering of the temperature to effect the final drying and cooling of the articles.

3. The herein described process of drying candies and the like in a substantially continuous operation with the employment of a plurality of drying chambers which consists of placing the articles within the drying chambers, circulating heated air through the chambers to effect the initial drying of the articles and thereafter circulating dehydrated air through the chambers to effect the final drying and cooling of the articles, the respective operations of charging, initial drying and cooling being performed simultaneously in different chambers and successively with respect to a given chamber.

4. The herein described process of drying candies and the like which consists in placing the articles within a suitable drying chamber, circulating heated air through the chamber in a cycle with the by-passing of a portion of the air through a dehydrator to maintain proper hygrometric conditions whereby the drying may be done at a lower temperature, and subsequently circulating all dehydrated air through the chamber to effect the final stage of drying and cooling.

Signed at New York, in the county of New York and State of New York, this 16th day of June, A. D. 1924.

AUGUSTE A. GOUBERT.